United States Patent
Cope (10) Patent No.: US 11,654,000 B2
(45) Date of Patent: May 23, 2023

(54) ANTEROPOSTERIOR CORRECTION DEVICES

(71) Applicant: Under Dog Media, L.P., Dallas, TX (US)

(72) Inventor: Jason B. Cope, Dallas, TX (US)

(73) Assignee: Under Dog Media, L.P., Dallas, TX (US)

(*) Notice: Subject to any disclaimer, the term of this patent is extended or adjusted under 35 U.S.C. 154(b) by 306 days.

(21) Appl. No.: 16/678,145

(22) Filed: Nov. 8, 2019

(65) Prior Publication Data

US 2020/0146782 A1    May 14, 2020

Related U.S. Application Data

(60) Provisional application No. 62/758,097, filed on Nov. 9, 2018.

(51) Int. Cl.
| | |
|---|---|
| *A61C 7/34* | (2006.01) |
| *A61C 7/14* | (2006.01) |
| *A61C 7/36* | (2006.01) |
| *A61C 7/28* | (2006.01) |

(52) U.S. Cl.
CPC .............. *A61C 7/34* (2013.01); *A61C 7/141* (2013.01); *A61C 7/143* (2013.01); *A61C 7/282* (2013.01); *A61C 7/36* (2013.01)

(58) Field of Classification Search
CPC ................................. A61C 7/12; A61C 7/36
See application file for complete search history.

(56) References Cited

U.S. PATENT DOCUMENTS

| | | | | |
|---|---|---|---|---|
| 274,367 | A * | 3/1883 | Patrick | |
| 678,452 | A * | 7/1901 | Angle | |
| 3,158,934 | A * | 12/1964 | Waldman | A61C 7/285 433/22 |
| 5,873,715 | A * | 2/1999 | Liou | A61C 7/00 433/18 |
| 6,341,956 | B1 * | 1/2002 | Liou | A61C 7/12 433/17 |
| 6,884,067 | B2 * | 4/2005 | Tuneberg | A61C 7/36 433/19 |
| 6,976,839 | B2 * | 12/2005 | Lluch | A61C 7/00 433/18 |
| 7,416,409 | B2 * | 8/2008 | Farber | A61C 7/36 433/18 |
| 7,618,257 | B2 | 11/2009 | Lluch | |
| 8,662,889 | B2 * | 3/2014 | Baker | A61C 7/00 433/18 |
| 9,649,176 | B2 | 5/2017 | Carriere Lluch | |
| 9,687,318 | B2 | 6/2017 | Carriere Lluch et al. | |
| 9,827,072 | B2 | 11/2017 | Carriere Lluch | |
| 9,987,104 | B2 | 6/2018 | Carriere Lluch | |

(Continued)

*Primary Examiner* — Ralph A Lewis
(74) *Attorney, Agent, or Firm* — Shackelford, Bowen, McKinley & Norton, LLP; David L. Odom (57) ABSTRACT

In an embodiment, the present disclosure relates to a segmental distalization device that includes an elongate bar having a distal end and a mesial end, a distal base on the distal end of the elongate bar, a mesial base on the mesial end of the elongate bar, and an attachment member attached to at least one of the elongate bar, the distal base, and the mesial base. In some embodiments, the attachment member is operable to connect the segmental distalization device to an anchor via an elastic connector.

13 Claims, 8 Drawing Sheets

(56) References Cited

U.S. PATENT DOCUMENTS

| | | | |
|---|---|---|---|
| 10,939,981 B2* | 3/2021 | Voudouris | A61C 7/28 |
| 2009/0061377 A1* | 3/2009 | Cope | A61C 7/00 |
| | | | 433/18 |
| 2013/0280670 A1* | 10/2013 | Edgren | A61C 7/36 |
| | | | 433/19 |
| 2019/0029776 A1* | 1/2019 | Voudouris | A61C 7/20 |

* cited by examiner

ANTEROPOSTERIOR CORRECTION DEVICES

CROSS-REFERENCE TO RELATED APPLICATIONS

This patent application claims priority from, and incorporates by reference the entire disclosure of, U.S. Provisional Patent Application No. 62/758,097 filed on Nov. 9, 2018.

TECHNICAL FIELD

The present disclosure relates generally to anteroposterior correction and more particularly, but not by way of limitation, to devices for anteroposterior correction.

BACKGROUND

This section provides background information to facilitate a better understanding of the various aspects of the disclosure. It should be understood that the statements in this section of this document are to be read in this light, and not as admissions of prior art.

Dental irregularities such as malocclusions, a misalignment or incorrect relation between the teeth of the two dental arches when they approach each other as the jaws close, have become increasingly prevalent. The correction of dental irregularities, for example, malocclusions requires applying controlled forces to the teeth in order to obtain proper alignment. An important aim is to arrange space for teeth in the jaw in such a manner that the teeth can be positioned properly and can contact each other in their desired positions.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure relates to a segmental distalization device that includes an elongate bar having a distal end and a mesial end, a distal base on the distal end of the elongate bar, a mesial base on the mesial end of the elongate bar, and an attachment member attached to at least one of the elongate bar, the distal base, and the mesial base. In some embodiments, the attachment member is operable to connect the segmental distalization device to an anchor via an elastic connector.

In some embodiments, the attachment member is a plurality of attachment members, each attachment member of the plurality of attachment members being connected to at least one of the elongate bar, the distal base, and the mesial base. In some embodiments, the segmental distalization device includes a plurality of threaded cavities along the elongate bar, the distal base, and the mesial base. In some embodiments, the attachment member is slidably attached to the elongate bar via a setscrew. In some embodiments, the attachment member can include, without limitation, a pin, a hook, a mushroom head-shaped pin, a receptacle to receive an attachment device, a pin, hook, or mushroom head-shaped pin with a threaded cavity operable to receive a setscrew to fasten the pin, hook, or mushroom head-shaped pin to the elongate bar via an opening of the pin, hook, or mushroom head-shaped pin operable to receive the elongate bar, or combinations thereof. In some embodiments, the attachment member is operable to be rotated up to 360 degrees to thereby allow for customizable forces to be applied to teeth subjected to the segmental distalization device. In some embodiments, usage of the attachment member at various locations of the elongate bar allows for three-dimensional control of forces acting on teeth.

In a further embodiment, the present disclosure relates to a segmental distalization that includes an elongate bar having a distal end and a mesial end, the distal end having a flanged end opposite the mesial end, a distal base attached the distal end of the elongate bar, a mesial base on the mesial end of the elongate bar, and an attachment member attached to at least one of the elongate bar, the distal base, and the mesial base. In some embodiments, the attachment member is operable to connect the segmental distalization device to an anchor via an elastic connector.

In some embodiments, the flanged end is received into the distal base through an opening of the distal base to thereby attach the elongate bar to the distal base. In some embodiments, the elongate bar is secured into the distal base by a securing mechanism that can include, without limitation, a setscrew, a clamp, a lock pin, a compression of the opening, a partial compression of the opening, or combinations thereof. In some embodiments, attachment of the elongate bar to the distal base is at an angle oblique to the distal base. In some embodiments, the flanged end is cylindrical in shape, operable to be received into a bracket on the distal base to thereby form a hinge. In some embodiments, the attachment member is a plurality of attachment members, each attachment member of the plurality of attachment members being connected to at least one of the elongate bar, the distal base, and the mesial base. In some embodiments, the segmental distalization device includes a plurality of threaded cavities along the elongate bar, the distal base, and the mesial base. In some embodiments, the attachment member is slidably attached to the elongate bar via a setscrew.

In an additional embodiment, the present disclosure relates to a segmental distalization device including a first tubular component having a distal base, a second tubular component having a mesial base, the first tubular component being telescopically engaged with the second tubular component, an elongate bar formed by a portion of the first tubular component and a portion of the second tubular component, and an attachment member attached to at least one of the elongate bar, the distal base, and the mesial base. In some embodiments, the attachment member is operable to connect the segmental distalization device to an anchor via an elastic connector.

In some embodiments, the attachment member is a plurality of attachment members, each attachment member of the plurality of attachment members being connected to at least one of the elongate bar, the distal base, and the mesial base. In some embodiments, the segmental distalization device includes a plurality of threaded cavities along the elongate bar, the distal base, and the mesial base. In some embodiments, the attachment member is slidably attached to the elongate bar via a setscrew. In some embodiments, the first tubular component and the second tubular component are spaced apart telescopically to achieve a desired length of the segmental distalization device.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Several devices for orthodontic treatment are known in order to correct the misalignment of teeth or incorrect relationship between teeth. Some of the devices that are typically employed include segmental distalization devices that require the use of both the upper and the lower jawbones. The multi-jawbone devices are unpleasant in design and cause the orthodontic treatment to be easily noticeable. Furthermore, pain might be experienced with these invasive solutions, and often times, the quality of the speech can also be affected. Moreover, the current segmental distalization devices available only allow for a limited control of the forces acting on the teeth. Aspects of the present disclosure seek to provide a segmental distalization device that is highly customizable with respect to the forces acting upon the teeth. Moreover, the segmental distalization devices of the present disclosure can provide a mechanism that has multiple arrangements, and can utilize both jawbones and/or a single jawbone to move teeth depending on the desired need or desired outcome.

Reference will now be made to more specific embodiments of the present disclosure relating to devices for segmental distalization (or mesialization) utilizing temporary anchorage devices, for example, mini-screws, implants, or anchors, for anteroposterior correction. However, it should be noted that the disclosure below is for illustrative purposes only and is not intended to limit the scope of the claimed subject matter in any way.

As shown in FIGS. 1-9, in various embodiments, a segmental distalization device includes an elongate bar having a distal (i.e., posterior) end and a mesial (i.e., anterior) end thereof. The distal end includes a distal base with a surface adapted to be attached to a lingual (i.e., inner) surface or labial (i.e., outer) surface of a molar, a premolar, a canine, an incisor, or combinations thereof. The mesial end includes a mesial base with a surface adapted to be attached to a lingual or labial surface of a molar, a premolar, a canine, an incisor, or combinations thereof.

The surface of the distal base and the mesial base can include various shapes suitable for attachment to a molar, a premolar, a canine, an incisor, or combinations thereof. In some embodiments, the distal base and the mesial base surfaces can include at least one of various types of protrusions such as, for example, ridges, folds, points, bumps, hooks, or combinations of the same and like. In various embodiments, the distal base and the mesial base surfaces may be mounted to the teeth using, for example, adhesive dental cement and/or orthodontic bands. In some embodiments, the distal base and the mesial base can be thicker than the elongate bar. In various embodiments, the distal base and the mesial base can be of similar thickness compared to the elongate bar.

In some embodiments, the elongate bar of the segmental distalization device can be adapted, for example, in order to conform to the shape of the labial dental arch or the lingual dental arch, for example, between a molar and a canine. In various embodiments, the elongate bar of the segmental distalization device can be slightly inwardly or outwardly concave with respect to the labial dental arch or lingual dental arch. As such, the distalization device can be utilized in various parts of the mouth, for example, the left or right side of the mandible (i.e., lower jawbone), or the left or right side of the maxilla (i.e., upper jawbone).

Figure 1:
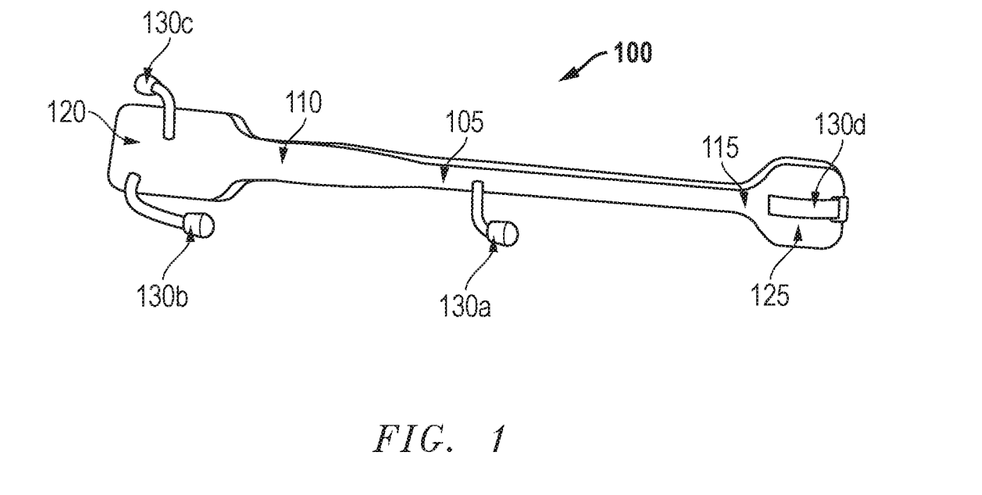
FIG. 1 illustrates a segmental distalization device with attachment members according to an aspect of the present disclosure.
Figure 2:
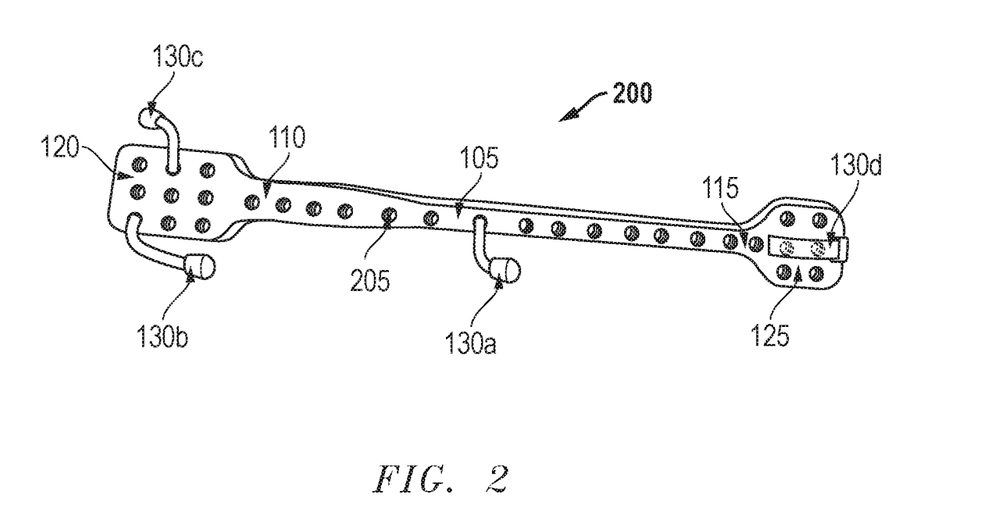
FIG. 2 illustrates a segmental distalization device that has threaded cavities operable to receive an attachment member according to an aspect of the present disclosure.
Figure 3:
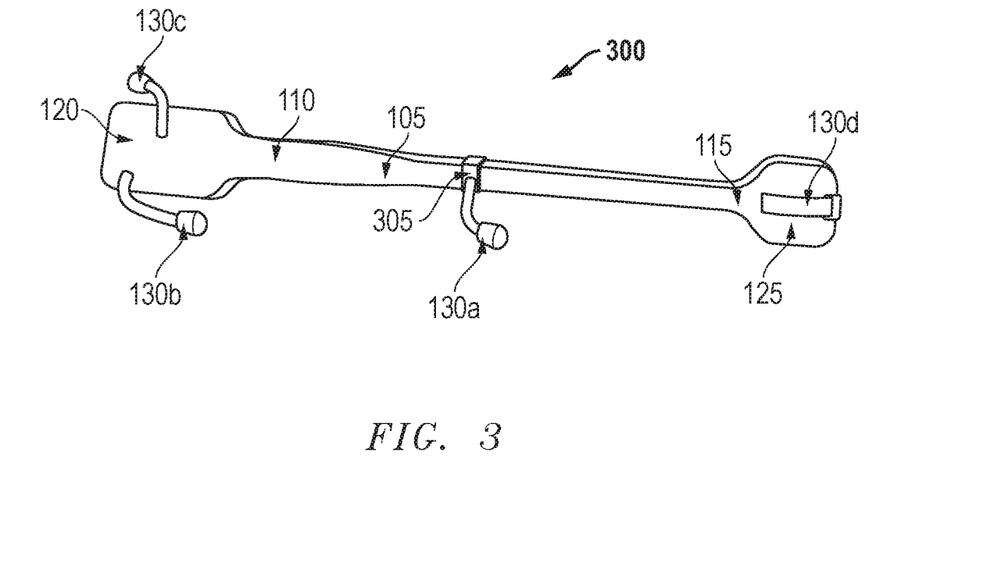
FIG. 3 illustrates a segmental distalization device that has an attachment member that is attached to a setscrew that can slidably mount onto an elongate bar according to an aspect of the present disclosure.

As shown in the various embodiments of FIGS. 1-3, the segmental distalization device can include a single element, or multiple elements, made from a suitable orthodontic material including, but not limited to, stainless steel, titanium-molybdenum alloy, nickel titanium, or combinations of the same and like. In some embodiments, the segmental distalization device can be made from a combination of different suitable orthodontic materials such that the segmental distalization device can have different material properties at various locations. For example, the distal end or the mesial end of the elongate bar can be made of a softer material from that of the opposing end such that one end is flexible relative to the opposing end. In some embodiments, both the distal end and the mesial end of the elongate bar can be made of a softer material from that of the center of the elongate bar such that the distal end and the mesial end are flexible relative to the center of the elongate bar.

Figure 10:
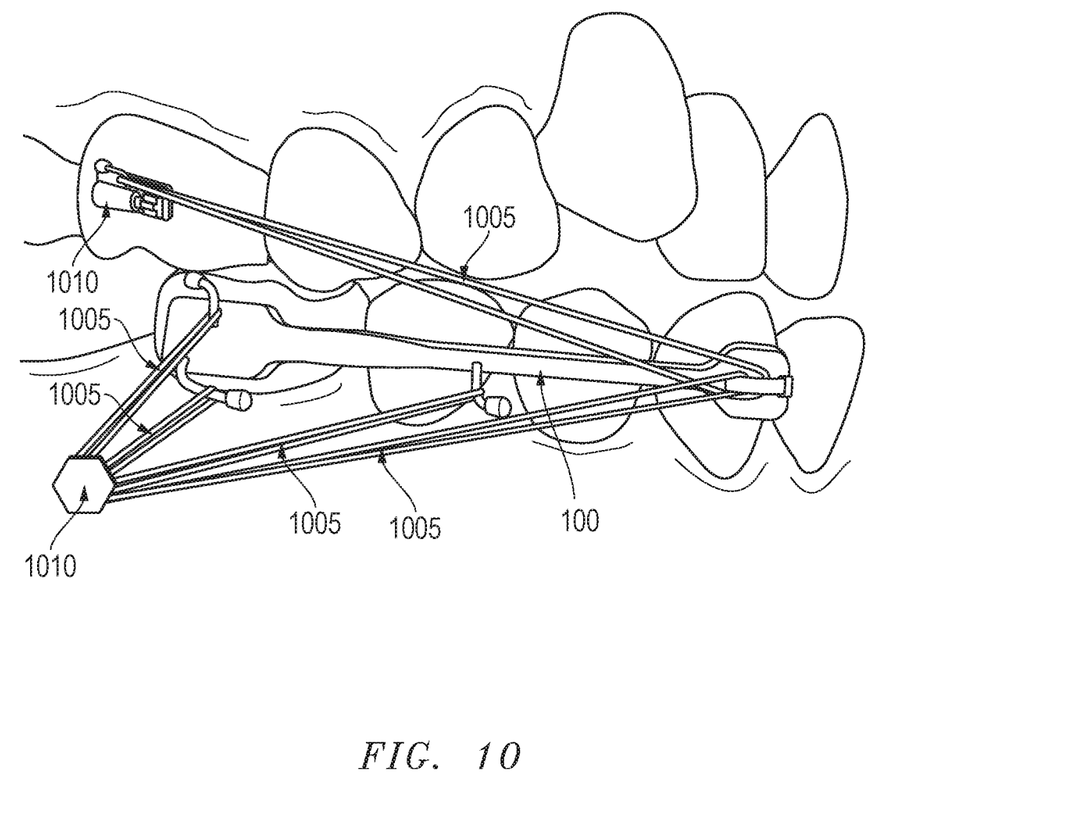
FIG. 10 illustrates an embodiment of the segmental distalization device of FIG. 1, according to an aspect of the present disclosure, placed in a mouth.
Figure 11:
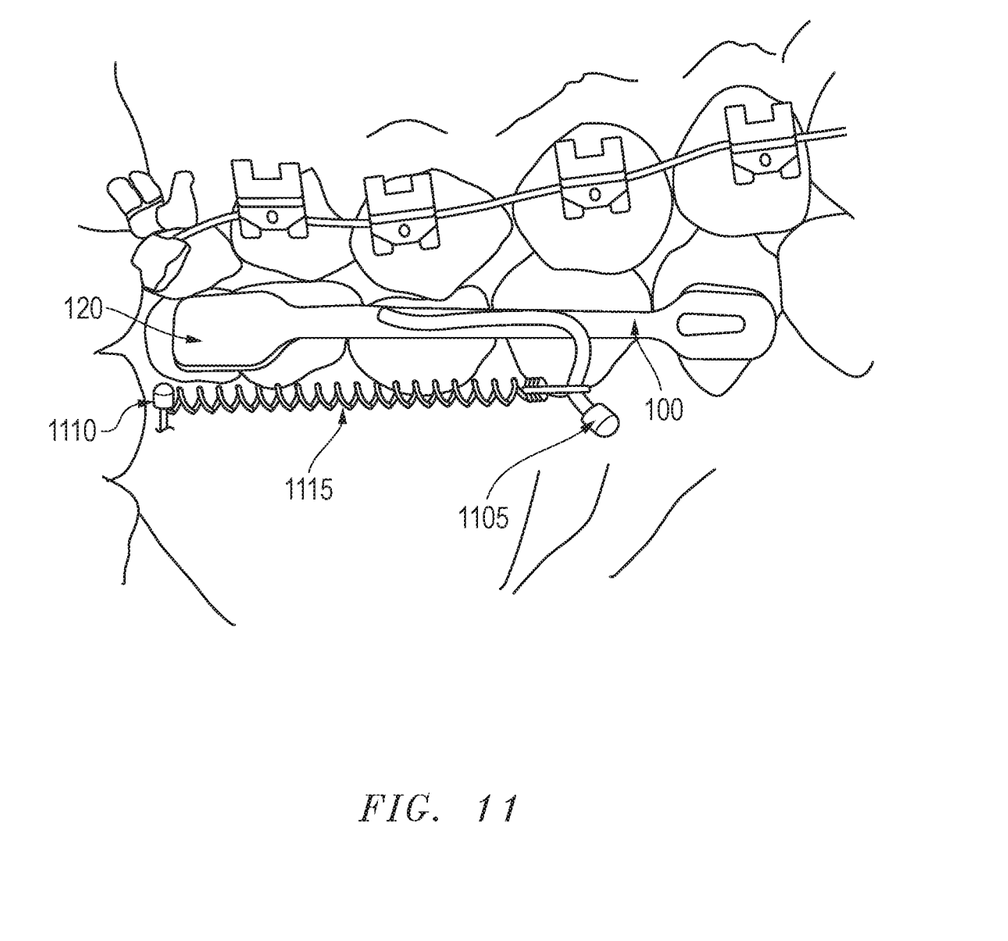
FIG. 11 illustrates an additional embodiment of the segmental distalization device of FIG. 1, according to an aspect of the present disclosure, placed in a mouth utilizing fewer attachment members and a modified attachment member.

Referring now to FIG. 1, a segmental distalization device 100 includes an elongate bar 105 having a distal end 110 and a mesial end 115 thereof. The distal end 110 includes a distal base 120 with a surface adapted to be attached to a lingual surface or labial surface of, for example, a molar, a premolar, a canine, an incisor, or combinations thereof. The mesial end 115 includes a mesial base 125 with a surface adapted to be attached to a lingual or labial surface of, for example, a molar, a premolar, a canine, an incisor, or combinations thereof. The segmental distalization device 100 can include an attachment member 130a, 130b, 130c, and/or 130d. As shown in FIG. 1, in an embodiment, the elongate bar 105 of the segmental distalization device 100 includes the attachment member 130a between the distal base 120 and the mesial base 125 extending generally perpendicular from the elongate bar 105 to facilitate the connection of an elastic connector to an anchor, as illustrated in FIGS. 10-11 and discussed below, thereby providing force to the teeth subjected to the segmental distalization device 100. In various embodiments, the attachment member 130a, 130b, 130c, and/or 130d can be a pin, a hook, a mushroom head-shaped pin, a receptacle to receive an attachment device, a pin, hook, or mushroom head-shaped pin with a threaded cavity operable to receive a setscrew to fasten the pin, hook, or mushroom head-shaped pin to the elongate bar 105 via an opening of the pin, hook, or mushroom head-shaped pin operable to receive the elongate bar 105, or similar members with varying profiles. In some embodiments, the attachment member 130a, 130b, 130c, and/or 130d can be attached to the elongate bar 105, the distal base 120, and/or the mesial base 125 via, for example, soldering, dental and orthodontic welding, utilizing adhesives, utilizing threaded connections, or combinations of the same and like. In various embodiments, for example, as shown in FIG. 1, there can be a plurality of attachment members, for example, attachment member 130a, 130b, 130c, and/or 130d, attached to a plurality of locations, such as, but not limited to, the elongate bar 105, the distal base 120, and/or the mesial base 125. For example, the attachment member 103a can be attached to the elongate bar 105. The attachment member 130b and the attachment member 130c can be attached to the distal base 120 and the attachment member 130d can be attached to the mesial base 125, as shown in FIG. 1. In this manner, multiple forces can act on the teeth subjected to the segmental distalization device.

The attachment member 130a, 130b, 130c, and/or 130d can be utilized to connect the segmental distalization device 100 to an anchor mounted within the mouth, such as that illustrated in FIGS. 10-11 and discussed below. The anchor can be mounted on the same jawbone as the segmented distalization device 100 or the opposing jawbone. For example, the segmental distalization device 100 and the anchor can be mounted on the mandible, or the segmental distalization device 100 can be mounted on the mandible and the anchor mounted on the maxilla and vice versa. In some embodiments, the anchor can be mounted in the upper palate and/or the lower palate. In various embodiments, the anchor can be attached to a tooth using, for example, adhesive dental cement and/or orthodontic bands. In some embodiments, there can be a plurality of attachment members, for example, the attachment members 130a, 130b, 130c, and/or 130d, and a plurality of anchors connected via a plurality of elastic connectors, for example, as illustrated in FIG. 10.

The anchor can be connected to the segmental distalization device 100 by various elastic connectors, as illustrated in FIGS. 10-11, that produce a restoring force when stretched or compressed. In some embodiments, the anchor can be connected to the segmental distalization device 100 via the elastic connector which can be, for example, springs, elastic ligatures, elastic chains, force modules, or combinations of the same and like. In this manner, the elastic connector causes the segmental distalization device 100 to apply forces to a tooth or a group of teeth. The forces applied by this mechanism can include, but are not limited to, distal-mesial forces (i.e., forward), mesial-distal forces (i.e., backward), lingual-labial forces (i.e., outward), labial-lingual forces (i.e., inward), intrusive forces (i.e., upward in the upper jaw and downward in the lower jaw), extrusive forces (i.e., downward in the upper jaw and upward in the lower jaw), rotational forces about a coaxial axis of the root of a tooth, or combinations of the same and like. In various embodiments, the anchors can be temporary anchorage devices, implants, screws, various bone anchors, or combinations of the same and like. In some embodiments, the anchors can be a band, a bracket, a button, or other attachment device operable to be attached to a tooth. The placement of the attachment member 130a, 130b, 130c, and/or 130d and the anchor allows for the control of the forces acting on the teeth. In various embodiments, the usage of the attachment member 130a at various locations of the elongate bar 105 allows for complete three-dimensional control of the forces acting on the teeth. In some embodiments, the configuration allows for the use of the segmental distalization device 100 and the anchor to be on the same jaw, thus eliminating the need to use both the mandible and the maxilla if desired.

In some embodiments, the attachment member 130a, 130b, 130c, and/or 130d can be connected or mounted to the elongate bar 105, the distal base 120, and/or the mesial base 125 in a manner including, but not limited to, soldering, dental and orthodontic welding, utilizing adhesives, utilizing threaded connections, or combinations of the same and like. In some embodiments, the attachment member 130a, 130b, 130c, and/or 130d are operable to be rotated up to 360 degrees, thereby allowing for customizable forces to the teeth subjected to the segmental distalization device 100. In various embodiments, the attachment member 130a, 130b, 130c, and/or 130d can be an integral part of the segmental distalization device 100 to create a single, uniform, device. In other embodiments, the attachment member 130a can be an integral part of the elongate bar 105 to create a single, uniform, elongate bar. In various embodiments, the attachment member 130a, 130b, 130c, and/or 130d can be attached to the elongate bar 105, the distal base 120, the mesial base 125, or combinations thereof.

As shown in FIG. 2, in an embodiment, a segmental distalization device 200 can have threaded cavities 205 operable to receive the attachment member 130a, 130b, 130c, and/or 130d. In various embodiments, the attachment member 130a, 130b, 130c, and/or 130d can have a threaded end thereof to be received in the threaded cavities 205. In some embodiments, the attachment member 130a, 130b, 130c, and/or 130d can be attached to a washer, whereby a setscrew can pass through the washer and be received in the threaded cavities 205. In other embodiments, the attachment member 130a, 130b, 130c, and/or 130d can have a hole that allows for the passage of the setscrew such that the setscrew can be received in the threaded cavities 205 to attach the attachment member 130a, 130b, 130c, and/or 130d to the segmental distalization device 200. In this manner, the attachment member 130a, 130b, 130c, and/or 130d can be rotated up to 360 degrees, thereby allowing for customizable forces to the teeth subjected to the segmental distalization device 200.

The threaded cavities 205 can be spaced along the elongate bar 105 to allow for the positioning of the attachment member 130a, 130b, 130c, and/or 130d. In various embodiments, the threaded cavities 205 can be included, separately or in combination, on the elongate bar 105, the distal base 120, the mesial base 125, or combinations thereof to facilitate in positioning the attachment member 130a, 130b, 130c, and/or 130d on either end of the segmental distalization device 200 and across the elongate bar 105. The threaded cavities 205 can have varying depths over varying locations of the segmental distalization device 200. For example, the threaded cavities 205 can go through or partially through the elongate bar 105, whereas the threaded cavities 205, if included, on the distal base 120 and/or the mesial base 125 could be only partially through the distal base 120 and/or mesial base 125. In this manner, the distal base 120 and the mesial base 125 surfaces may be mounted to the teeth using, for example, adhesive dental cement without interfering with the threaded cavities 205.

The attachment member 130a can be between the distal base 120 and the mesial base 125 extending generally perpendicular from the elongate bar 105 to facilitate in the connection of an elastic connector to an anchor thereby providing force to the teeth subjected to the segmental distalization device 200. The attachment member 130a, 130b, 130c, and/or 130d can be utilized to connect the segmental distalization device 200 via the elastic connector to an anchor mounted within the mouth similar to that as described with respect to FIG. 1. In various embodiments, the attachment member 130a, 130b, 130c, and/or 130d, the anchor, and/or the elastic connector can function in a similar fashion to that of the attachment member 130a, 130b, 130c, and/or 130d, the anchor, and/or the elastic connector as described relative to FIG. 1.

As shown in FIG. 3, in an embodiment, the attachment member 130a of a segmental distalization device 300 can be attached to a setscrew 305 that can mount onto the elongate bar 105. In various embodiments, the attachment member 130a can be attached to the setscrew 305 that can be placed onto the elongate bar 105 and then moved, for example, by sliding along the elongate bar 105, in a desired direction, until the attachment member 130a is in a desired location, at this time the attachment member 130a can then be rotated about the axis of the elongate bar 105, and the setscrew 305 tightened to removably fix the attachment member 130a in place. In this manner, the attachment member 130a is able to move to the desired position relative to elongate bar 105 and can be rotated about an axis of the elongate bar 105 to ensure that the segmented distalization device 300 provides optimal force to be applied to the teeth. In some embodiments, the attachment member 130a is attached to a setscrew receiver having a partial opening in the body thereof such that the setscrew receiver can be mounted onto the elongate bar 105 and fastened to the elongate bar 105 by tightening a setscrew in the setscrew receiver.

The attachment member 130a can be between the distal base 120 and the mesial base 125 extending generally perpendicular from the elongate bar 105 to facilitate in the connection of an elastic connector to an anchor thereby providing force to the teeth subjected to the segmental distalization device 300. The attachment member 130a, 130b, 130c, and/or 130d can be utilized to connect the segmental distalization device 300 via the elastic connector to an anchor mounted within the mouth similar to that as described with respect to FIG. 1. In various embodiments, the attachment member 130a, 130b, 130c, and/or 130d, the anchor, and/or the elastic connector can function in a similar fashion to that of the attachment member 130a, 130b, 130c, and/or 130d, the anchor, and/or the elastic connector as described relative to FIG. 1.

As shown in the various embodiments presented in FIGS. 4-9, a segmental distalization device can include multiple components made from a suitable orthodontic material including, but not limited to, stainless steel, titanium-molybdenum alloy, nickel titanium, or combinations of the same and like. In various embodiments, the components can include the distal base 120, the mesial base 125, and the elongate bar 105 as described with respect to FIGS. 1-3; however, one or more of these can be separate and distinct components. For example, as will be discussed in further detail below, the elongate bar can be constructed such that the elongate bar is a separate component received into either the distal base or the mesial base. In some embodiments, the elongate bar can include a combination of different suitable orthodontic materials such that the elongate bar can have different material properties at various locations. For example, the distal end or the mesial end of the elongate bar can have a softer material from that of the opposing end such that one end is flexible relative to the opposing end. In some embodiments, both the distal end and the mesial end of the elongate bar can be made of a softer material from that of the center of the elongate bar such that the distal end and the mesial end are flexible relative to the center of the elongate bar. In some embodiments, the elongate bar can be made of a single material with varying thicknesses across the elongate bar, such that thinner or thicker regions of the elongate bar would provide varying flexibility.

Figure 4A:
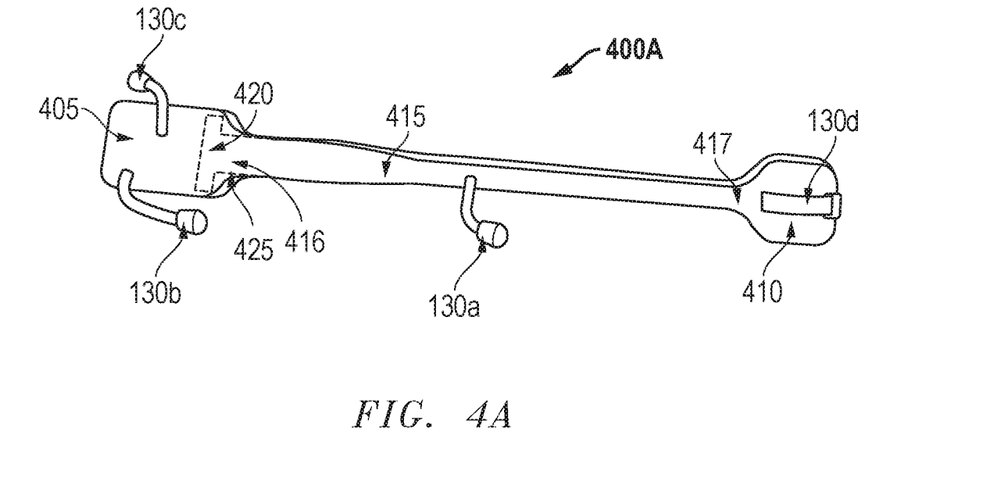
FIG. 4A illustrates a segmental distalization device that includes a distal base that can receive an elongate bar having a flanged end according to an aspect of the present disclosure.

As shown in FIG. 4A, in an embodiment, the segmental distalization device 400A can include a distal base 405 and/or a mesial base 410 that can receive and/or connect to an elongate bar 415 having a flanged end 420 on a distal end 416 and/or a mesial end 417. For example, the distal base 405 of the segmental distalization device 400A can include an opening 425 that can receive the flanged end 420 of the elongate bar 415 opposite the mesial base 410 of the elongated bar 415, as shown in FIG. 4A. In this manner, the segmental distalization device 400A can create a distal-mesial force and/or a mesial-distal force. In various embodiments, the opening 425 that receives the elongate bar 415 can be sized to allow for specific and/or limited movement of the elongate bar 415. In some embodiments, the opening 425 can include spacers to limit movement of the elongate bar 415 with the flanged end 420. In some embodiments, the opening 425 can include a securing mechanism to lock the elongate bar 415 with the flanged end 420 into the opening 425 of the distal base 405, such that the elongate bar 415 with the flanged end 420 is secure within the opening 425 of the distal base 405. In some embodiments, the securing mechanism can be a setscrew, a clamp, a lock pin, or combinations of the same and like. In various embodiments, a portion of the opening 425 can be compressed to close, or partially close, the opening 425 to prevent the elongate bar 415 from exiting the distal base 405. While the segmental distalization device 400A is described with respect to the opening 425 on the distal base 405, in various embodiments, the mesial base 410 can operate similar to the distal base 405 having an opening similar to that as the opening 425 as discussed relative to the segmental distalization device 400A.

In some embodiments, the distal base 405 and/or the mesial base 410 can receive the elongate bar 415 at various angles on the distal base 405 and/or the mesial base 410. For example, the segmental distalization device 400A can receive and/or connect to the elongate bar 415 at an oblique angle relative to the distal base 405 and/or the mesial base 410. In this manner, the segmental distalization device 400A can apply varying forces that can be, for example, rotational and/or vertical forces.

An attachment member 130a can be between the distal base 405 and the mesial base 410 extending generally perpendicular from the elongate bar 415 to facilitate in the connection of an elastic connector to an anchor thereby providing force to the teeth subjected to the segmental distalization device 400A. The attachment member 130a, 130b, 130c, and/or 130d can be utilized to connect the segmental distalization device 400A via the elastic connector to an anchor mounted within the mouth similar to that as described with respect to FIG. 1. In various embodiments, the attachment member 130a, 130b, 130c, and/or 130d, the anchor, and/or the elastic connector can function in a similar fashion to that of the attachment member 130a, 130b, 130c, and/or 130d, the anchor, and/or the elastic connector as described relative to FIG. 1.

In various embodiments, the attachment member 130a, 130b, 130c, and/or 130d can be connected to the segmental distalization device 400A substantially similar to that as described with respect to FIG. 1, for example, but not limited to, being soldered or screwed onto the elongate bar 415, the distal base 405, and/or the mesial base 410. In various embodiments, the elongate bar 415, the distal base 405, the mesial base 410, and/or the attachment member 130a, 130b, 130c, and/or 130d can be substantially similar to that as described with respect to FIG. 1.

Figure 4B:
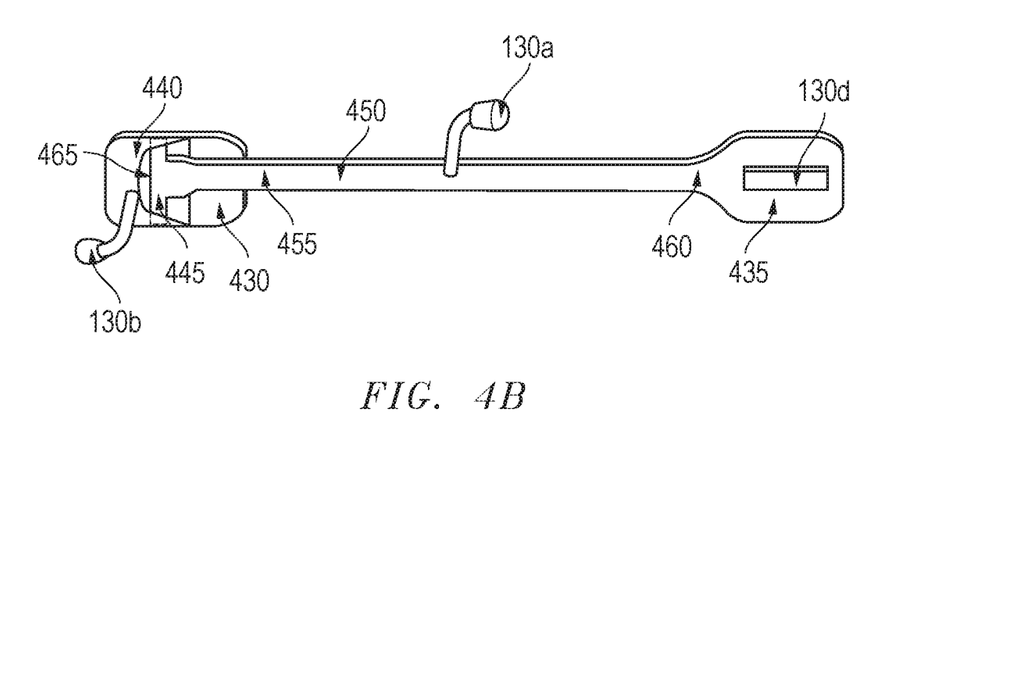
FIG. 4B illustrates a segmental distalization device that includes a distal base having a cylinder/hinge connection according to an aspect of the present disclosure.

As shown in FIG. 4B, in an embodiment, a distal base 430 or a mesial base 435 of a segmental distalization device 400B can include a bracket 440 that can connect to a cylindrical end 445 of an elongate bar 450 opposite the distal end 455 and/or the mesial end 460 of the elongated bar 450, thereby forming a hinge 465. For example, the distal base 430 can include the bracket 440 and the elongate bar 450 can include the cylindrical end 445 on the distal end 455 that can be attached to the bracket 440 on the distal base 430, as shown in FIG. 4B. In some embodiments, the elongate bar 450 can include a cylindrical shape perpendicular to the end of the elongate bar 450 thereby forming the cylindrical end 445. In this manner, the cylindrical end 445 is oriented vertically with the bracket 440 and creates the hinge 465 thereby allowing for rotational forces to act on a tooth. In some embodiments, the distal base 430 can be attached to, for example, a molar, while the mesial base 435 can be attached to, for example, a canine. Both the distal base 430 and the mesial base 435 can be on the same jawbone or the opposing jawbone. While the segmental distalization device 400B is described with respect to the bracket 440 and the hinge 465 on the distal base 430, in various embodiments, the mesial base 435 can operate similar to the distal base 430 having a bracket and hinge similar to that as the bracket 440 and the hinge 465, respectively, as discussed relative to the segmental distalization device 400B.

The embodiment of FIG. 4B can also incorporate features of the segmental distalization device 200 of FIG. 2. For example, the attachment member 130a, 130b, and/or 130d can be attached to the segmental distalization device 400B substantially similar to that as described with respect to FIG. 2, for example, by being attached to the elongate bar 450, the distal base 430, and/or the mesial base 435 by means of threaded cavities. In various embodiments, the elongate bar 450, the distal base 430, the mesial base 435, and/or the attachment member 130a, 130b, and/or 130d of the segmental distalization device 400B are substantially similar to that as described with respect to FIG. 2, and can have threaded cavities substantially similar to those relative to FIG. 2.

The embodiment of FIG. 4B can also incorporate features of the segmental distalization device 300 of FIG. 3. For example, the attachment member 130a can be attached to the elongate bar 450 substantially similar to that as described with respect to FIG. 3, for example, the attachment member 130a can be attached to a setscrew that can be placed onto the elongate bar 450 and then moved, for example, by sliding along the elongate bar 450, in a desired direction, until the attachment member 130a is in a desired location. In various embodiments, the elongate bar 450, the distal base 430, the mesial base 435, and/or the attachment member 130a, 130b, and/or 130d of the segmental distalization device 400B are substantially similar to that as described with respect to FIG. 3.

Figure 12:
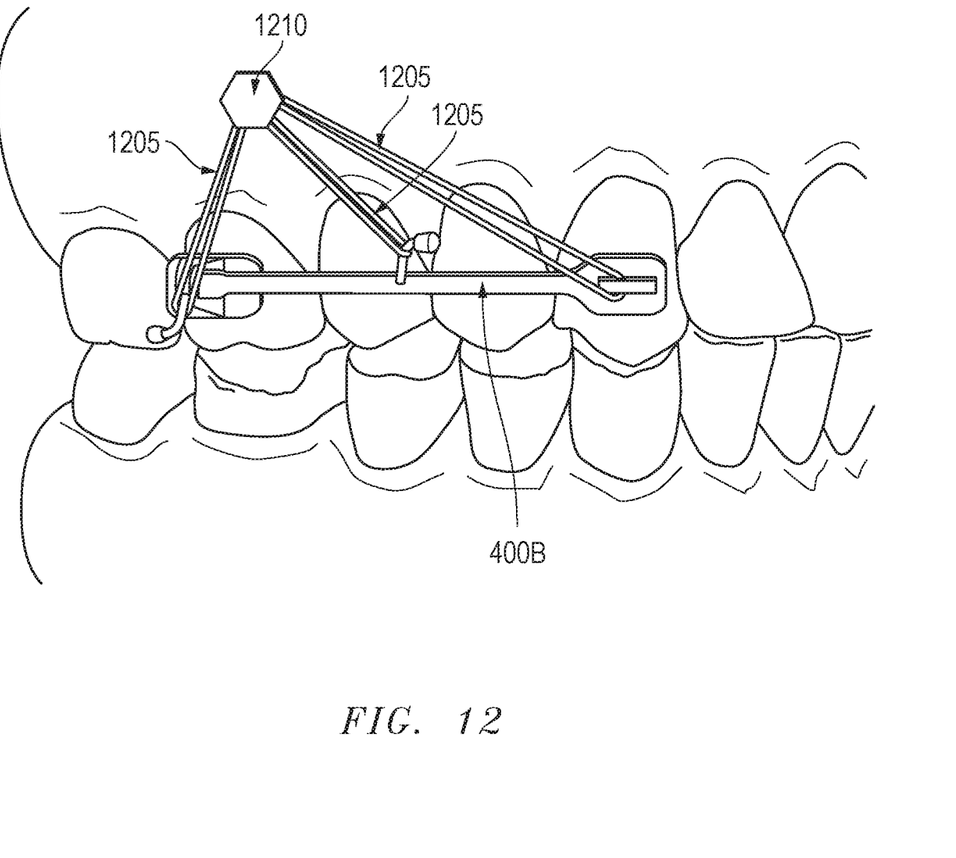
FIG. 12 illustrates an embodiment of the segmental distalization device of FIG. 4B, according to an aspect of the present disclosure, placed in a mouth.

The attachment member 130a can be between the distal base 430 and the mesial base 435 extending generally perpendicular from the elongate bar 450 to facilitate in the connection of an elastic connector to an anchor, as illustrated in FIG. 12 and discussed below, thereby providing force to the teeth subjected to the segmental distalization device 400B. The attachment member 130a, 130b, and/or 130d can be utilized to connect the segmental distalization device 400B via the elastic connector to an anchor mounted within the mouth similar to that as described with respect to FIG. 1 and further illustrated and described below relative to FIG. 12. In various embodiments, the attachment member 130a, 130b, and/or 130d, the anchor, and/or the elastic connector can function in a similar fashion to that of the attachment member 130a, 130b, 130c, and/or 130d, the anchor, and/or the elastic connector described relative to FIG. 1.

In various embodiments, the attachment member 130a, 130b, and/or 130d can be connected to segmental distalization device 400B substantially similar to that as described with respect to FIG. 1, for example, but not limited to, being soldered or screwed onto the elongate bar 450, the distal base 430, and/or the mesial base 435. In various embodiments, the elongate bar 450, the distal base 430, the mesial base 435, and/or the attachment member 130a, 130b, and/or 130d can be substantially similar to that as described with respect to FIG. 1.

Figure 5:
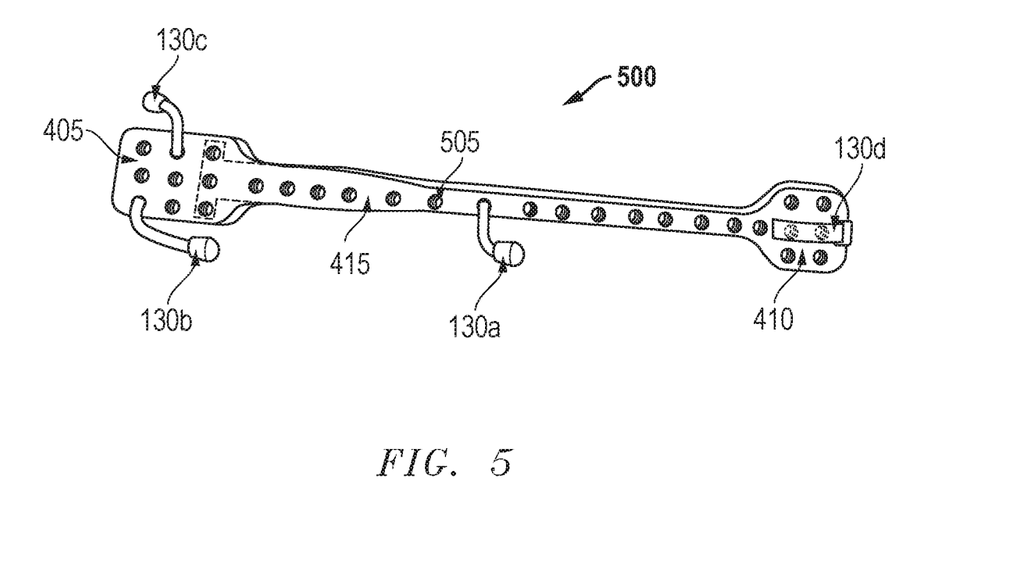
FIG. 5 illustrates the segmented distalization device of FIG. 4A, according to an aspect of the present disclosure, where an attachment member is attached to the elongate bar substantially similar to that as described with respect to FIG. 2.

FIG. 5 illustrates an embodiment of a segmented distalization device 500, similar to the segmented distalization device 400A of FIG. 4A, where the attachment member 130a, 130b, 130c, and/or 130d can be attached to the segmented distalization device 500 substantially similar to that as described with respect to the segmental distalization device 200 of FIG. 2, for example, by being attached to the elongate bar 415, the distal base 405, and/or the mesial base 410 by means threaded cavities 505. In various embodiments, the elongate bar 415, the distal base 405, the mesial base 410, the threaded cavities 505, and/or the attachment member 130a, 130b, 130c, and/or 130d of the segmental distalization device 500 are substantially similar to that as described with respect to FIG. 2.

Figure 6:
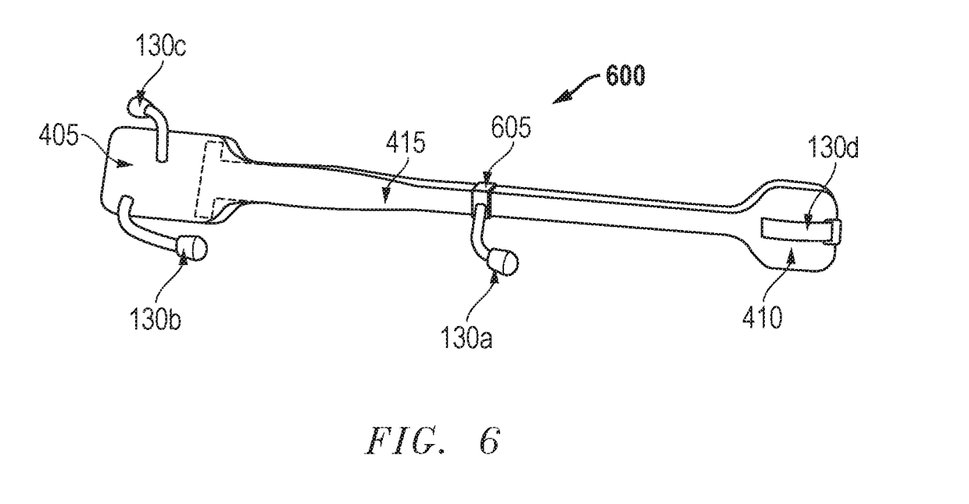
FIG. 6 illustrates the segmented distalization device of FIG. 4A, according to an aspect of the present disclosure, where an attachment member is attached to the elongate bar substantially similar to that as described with respect to FIG. 3.

FIG. 6 illustrates an embodiment of a segmented distalization device 600, similar to the segmented distalization device 400A of FIG. 4A, where the attachment member 130a can be attached to the elongate bar 415 substantially similar to that as described with respect to the segmental distalization device 300 of FIG. 3, for example, the attachment member 130a can be attached to a setscrew 605 that can be placed onto the elongate bar 415 and then moved, for example, by sliding along the elongate bar 415, in a desired direction, until the attachment member 130a is in a desired location. In some embodiments, the attachment member 130a is attached to a setscrew receiver having a partial opening in the body thereof such that the setscrew receiver can be mounted onto the elongate bar 415 and fastened to the elongate bar 415 by tightening a setscrew in the setscrew receiver. In various embodiments, the elongate bar 415, the distal base 405, the mesial base 410, the setscrew 605, and/or the attachment member 130a, 130b, 130c, and/or 130d of the segmented distalization device 600 are substantially similar to that as described with respect to FIG. 3.

Figure 7:
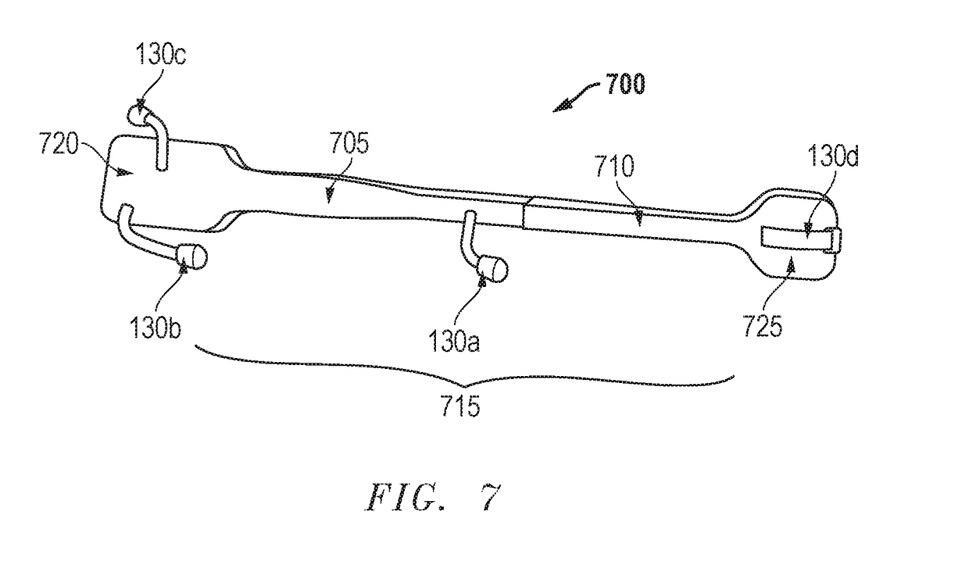
FIG. 7 illustrates a segmental distalization device that includes telescoping tubular components having a first tubular component and a second tubular component to form an elongate bar according to an aspect of the present disclosure.

As shown in FIG. 7, in an embodiment, a segmental distalization device 700 can include telescoping tubular components having a first tubular component 705 and a second tubular component 710 forming an elongate bar 715. The first tubular component 705 can include a distal base 720, while the second tubular component 710 can include a mesial base 725. The telescoping tubular components can make up the elongated bar 715 that is length-adjustable. For example, a portion of the first tubular component 705 and a portion of the second tubular component 710 can for the elongate bar 715. When a desired length is obtained, the first tubular component 705 and the second tubular component 710 can be connected together via, for example, soldering, dental and orthodontic welding, utilizing adhesives, screwing, clamping, or combinations of the same and like. In this manner, the overall length of the segmental distalization device 700 can be customized to a desired length to account for particular tooth spacing and can then form the segmental distalization device 700. In some embodiments, the elongated bar 715, the distal base 720, and the mesial base 725 of the segmental distalization device 700 are substantially similar to that as shown and described in FIG. 1.

The attachment member 130a can be between the distal base 720 and the mesial base 725 extending generally perpendicular from the elongate bar 715 to facilitate in the connection of an elastic connector to an anchor thereby providing force to the teeth subjected to the segmental distalization device 700. The attachment member 130a, 130b, 130c, and/or 130d can be utilized to connect the segmental distalization device 700 via the elastic connector to an anchor mounted within the mouth similar to that as described with respect to FIG. 1. In various embodiments, the attachment member 130a, 130b, 130c, and/or 130d, the anchor, and/or the elastic connector can function in a similar fashion to that of the attachment member 130a, 130b, 130c, and/or 130d, the anchor, and/or the elastic connector as described relative to FIG. 1.

In various embodiments, the attachment member 130a, 130b, 130c, and/or 130d can be connected to the segmental distalization device 700 substantially similar to that as described with respect to FIG. 1, for example, but not limited to, being soldered or screwed onto the elongate bar 715, the distal base 720, and/or the mesial base 725. In various embodiments, the elongate bar 715, the distal base 720, the mesial base 725, and/or the attachment member 130a, 130b, 130c, and/or 130d can be substantially similar to that as described with respect to FIG. 1.

Figure 8:
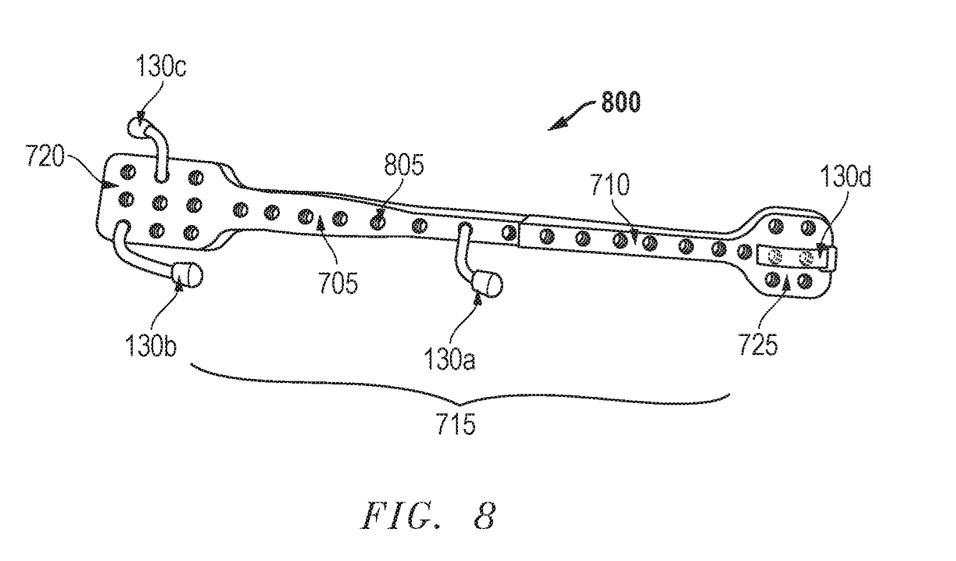
FIG. 8 illustrates the segmented distalization device of FIG. 7, according to an aspect of the present disclosure, where an attachment member is attached to the elongate bar substantially similar to that as described with respect to FIG. 2.

FIG. 8 illustrates an embodiment of a segmented distalization device 800, similar to the segmental distalization device 700 of FIG. 7, where the attachment member 130a, 130b, 130c, and/or 130d can be attached to the segmented distalization device 800 substantially similar to that as described with respect to the segmental distalization device 200 of FIG. 2, for example, by being attached to the elongate bar 715, the distal base 720, and/or the mesial base 725 by means of threaded cavities 805. In some embodiment, depending on the depths of threaded cavities 805 along the elongate bar 705 (e.g., cavities that form holes in the elongate bar) the first tubular component 705 and second tubular component 710 would be aligned such that the threaded cavities 805 from the first tubular component 705 are in an aligned-agreement with the threaded cavities 805 of the second tubular component 710, as to facilitate proper usage of setscrews. In various embodiments, the elongate bar 715, the distal base 720, the mesial base 725, the threaded cavities 805, and/or the attachment member 130a, 130b, 130c, and/or 130d of the segmental distalization device 800 are substantially similar to that as described with respect to FIG. 2.

Figure 9:
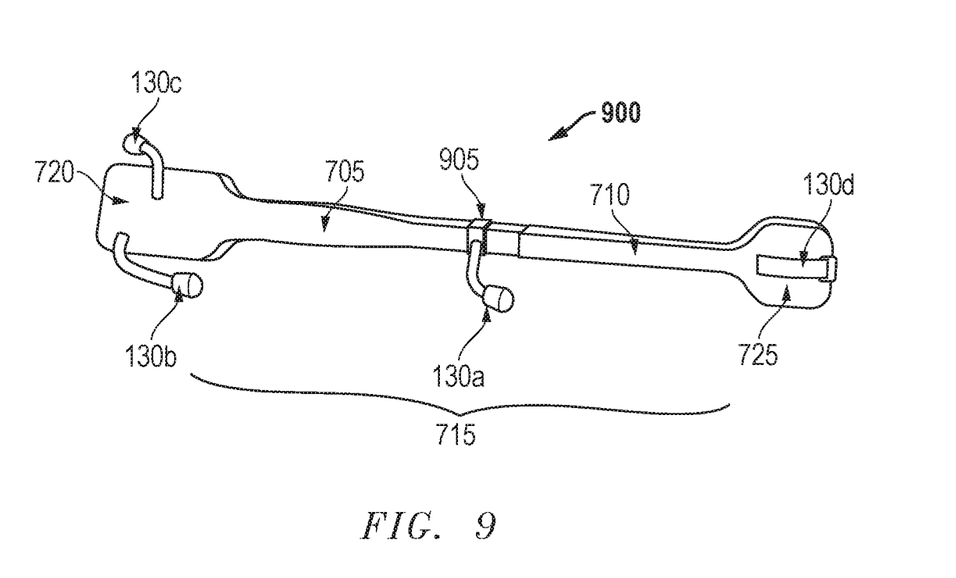
FIG. 9 illustrates the segmented distalization device of FIG. 7, according to an aspect of the present disclosure, where an attachment member is attached to the elongate bar substantially similar to that as described with respect to FIG. 3.

FIG. 9 illustrates an embodiment of a segmented distalization device 900, similar to the segmental distalization device 700 of FIG. 7, where the attachment member 130a can be attached to the elongate bar 715 substantially similar to that as described with respect to the segmental distalization device 300 of FIG. 3, for example, the attachment member 130a can be attached to a setscrew 905 that can be placed onto the elongate bar 715 and then moved, for example, by sliding along the elongate bar 715, in a desired direction, until the attachment member 130a is in a desired location. In some embodiments, the attachment member 130a is attached to a setscrew receiver having a partial opening in the body thereof such that the setscrew receiver can be mounted onto the elongate bar 715 and fastened to the elongate bar 715 by tightening a setscrew in the setscrew receiver. In various embodiments, the elongate bar 715, the distal base 720, the mesial base 725, the setscrew 905, and/or the attachment member 130a, 130b, 130c, and/or 130d of the segmental distalization device 900 are substantially similar to that as described with respect to FIG. 3.

In some embodiments, each component can be included in a kit such that each component can be connected together by soldering, dental and orthodontic welding, utilizing adhesives, or combinations of the same and like. In various embodiments, each component can be connected together by various mechanical means, such as, for example geometric lock and key fittings, screws, or combinations of the same and like. In some embodiments the kit can include an elongate bar, a distal base, a mesial base, and one or more attachment members. The elongate bar, the distal base, the mesial base, and/or the one or more attachment members can be substantially similar to that of the elongate bar, the distal base, the mesial base, and/or the attachment member as described in the preceding. Furthermore, in other embodiments, the kit can include various combinations of the elongate bar, the distal base, the mesial base, and/or the one or more attachment members as described in the preceding. In some embodiments, the kit can further include anchors such as temporary anchorage devices, implants, screws, various bone anchors, or combinations of the same and the like. In some embodiments, the anchors can be a band, a bracket, a button, or other attachment device operable to be attached to a tooth. In various embodiments, the kit can also include elastic connectors, for example, springs, elastic ligatures, elastic chains, or combinations of the same and like.

FIG. 10 illustrates an embodiment of the segmental distalization device 100 of FIG. 1 placed in a mouth. As can be seen in FIG. 10, the segmental distalization device 100 has elastic connectors 1005 connecting the segmental distalization device 100 to anchors 1010. The anchors 1010 can be mounted on the same jawbone as the segmented distalization device 100, the opposing jawbone, or combinations thereof. For example, the segmental distalization device 100 and the anchors 1010 can be mounted on the mandible, or the segmental distalization device 100 can be mounted on the mandible and the anchors 1010 mounted on the maxilla and vice versa. In some embodiments, the anchors 1010 can be mounted on the mandible, the maxilla, the upper jawbone, the lower jawbone, or combinations of the same and like. In some embodiments, the anchors 1010 can be mounted in the upper palate and/or lower palate. In various embodiments, the anchors 1010 can be attached to a tooth using, for example, adhesive dental cement and/or orthodontic bands. The anchors 1010 can be connected to the segmental distalization device 100 by the elastic connectors 1005 thereby producing a restoring force when stretched or compressed. In some embodiments, the anchors 1010 can be connected to the segmental distalization device 100 via the elastic connectors 1005 which can be, for example, springs, elastic ligatures, elastic chains, force modules, or combinations of the same and like. In this manner, the elastic connectors 1005 cause the segmental distalization device 100 to apply forces to a tooth or a group of teeth. The forces applied by this mechanism can include, but are not limited to, distal-mesial forces, mesial-distal forces, lingual-labial forces, labial-lingual forces, intrusive forces, extrusive forces, rotational forces about a coaxial axis of the root of a tooth, or combinations of the same and like. In various embodiments, the anchors 1010 can be temporary anchorage devices, implants, screws, various bone anchors, or combinations of the same and like. In some embodiments, the anchors can be a band, a bracket, a button, or other attachment device operable to be attached to a tooth.

FIG. 11 illustrates an additional embodiment of the segmental distalization device 100 of FIG. 1 placed in a mouth utilizing fewer attachment members, that is, the attachment members 130b and 130c have been removed from the distal base 120 and the attachment member 130a has been replaced with a modified attachment member 1105. As shown in FIG. 11, the modified attachment member 1105 of the segmental distalization device 100 is connected to an anchor 1110 via an elastic connector 1115. The anchor 1110 can be mounted on the same jawbone as the segmented distalization device 100, the opposing jawbone, or combinations thereof. In some embodiments, the anchor 1110 can be mounted on the mandible, the maxilla, the upper jawbone, the lower jawbone, or combinations of the same and like. In some embodiments, the anchor 1110 can be mounted in the upper palate and/or lower palate. In various embodiments, the anchor 1110 can be attached to a tooth using, for example, adhesive dental cement and/or orthodontic bands. The anchor 1110 can be connected to the segmental distalization device 100 by the elastic connector 1115 thereby producing a restoring force when stretched or compressed. In some embodiments, the anchor 1110 can be connected to the segmental distalization device 100 via the elastic connector 1115 which can be, for example, springs, elastic ligatures, elastic chains, force modules, or combinations of the same and like. In this manner, the elastic connector 1115 causes the segmental distalization device 100 to apply forces to a tooth or a group of teeth. The forces applied by this mechanism can include, but are not limited to, distal-mesial forces, mesial-distal forces, lingual-labial forces, labial-lingual forces, intrusive forces, extrusive forces, rotational forces about a coaxial axis of the root of a tooth, or combinations of the same and like. In various embodiments, the anchor 1110 can be temporary anchorage devices, implants, screws, various bone anchors, or combinations of the same and like. In some embodiments, the anchors can be a band, a bracket, a button, or other attachment device operable to be attached to a tooth.

FIG. 12 illustrates an embodiment of the segmental distalization device 400B of FIG. 4B placed in a mouth. As can be seen in FIG. 12, the segmental distalization device 400B has elastic connectors 1205 connecting the segmental distalization device 400B to an anchor 1210. The anchor 1210 can be mounted on the same jawbone as the segmented distalization device 400B, the opposing jawbone, or combinations thereof. For example, the segmental distalization device 400B and the anchor 1210 can be mounted on the mandible, or the segmental distalization device 400B can be mounted on the mandible and the anchor 1210 mounted on the maxilla. In some embodiments, the anchor 1210 can be mounted on the mandible, the maxilla, the upper jawbone, the lower jawbone, or combinations of the same and like. In some embodiments, the anchor 1210 can be mounted in the upper palate and/or the lower palate. In various embodiments, the anchor 1210 can be attached to a tooth using, for example, adhesive dental cement and/or orthodontic bands. The anchor 1210 can be connected to the segmental distalization device 400B by the elastic connectors 1205 thereby producing a restoring force when stretched or compressed. In some embodiments, the anchor 1210 can be connected to the segmental distalization device 400B via the elastic connectors 1205 which can be, for example, springs, elastic ligatures, elastic chains, force modules, or combinations of the same and like. In this manner, the elastic connectors 1205 cause the segmental distalization device 400B to apply forces to a tooth or a group of teeth. The forces applied by this mechanism can include, but are not limited to, distal-mesial forces, mesial-distal forces, lingual-labial forces, labial-lingual forces, intrusive forces, extrusive forces, rotational forces about a coaxial axis of the root of a tooth, or combinations of the same and like. In various embodiments, the anchor 1210 can be temporary anchorage devices, implants, screws, various bone anchors, or combinations of the same and like. In some embodiments, the anchors can be a band, a bracket, a button, or other attachment device operable to be attached to a tooth.

While FIGS. 1-12 have been described relative to distalization, forces applied to a tooth or group of teeth can include a variety of forces, including, but not limited to, distal-mesial forces, mesial-distal forces, lingual-labial forces, labial-lingual forces, intrusive forces, extrusive forces, rotational forces about a coaxial axis of the root of a tooth, or combinations of the same and like. As such, an aspect of the present disclosure further relates to mesialization utilizing the devices of the present disclosure. For example, anchors can be placed in a location such that forces are applied in a distal-mesial direction to thereby create mesialization as opposed to distalization. Further utilization of the anchor location can be used to provide any force, or combination of forces, such as, but not limited to, distal-mesial forces, mesial-distal forces, lingual-labial forces, labial-lingual forces, intrusive forces, extrusive forces, or rotational forces about a coaxial axis of the root of a tooth.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein. The term "substantially" is defined as largely but not necessarily wholly what is specified, as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A segmental distalization device comprising:
   an elongate bar having a distal end and a mesial end;
   a distal base on the distal end of the elongate bar;
   a mesial base on the mesial end of the elongate bar;
   a plurality of threaded cavities permanently configured into the elongate bar, the distal base, and the mesial base, wherein an attachment member is connected to the elongate bar in one or more of the threaded cavities of at least one of the elongate bar, the distal base, and the mesial base; and
   wherein the attachment member is operable to connect the segmental distalization device to an anchor via an elastic connector.

2. The segmental distalization device of claim 1, wherein the segmental distalization device comprises one or more attachment members, wherein each attachment member is removably and adjustably connected to at least one of the elongate bar, the distal base, and the mesial base.

3. The segmental distalization device of claim 1, wherein the attachment member is operable to be rotated up to 360 degrees to thereby allow for customizable forces to be applied to teeth subjected to the segmental distalization device.

4. The segmental distalization device of claim 1, where usage of the attachment member at various locations of the elongate bar allows for three-dimensional control of forces acting on teeth.

5. A segmental distalization device comprising:
   a first tubular component having a distal base;
   a second tubular component having a mesial base, the first tubular component being telescopically engaged with the second tubular component;
   an elongate bar formed by a portion of the first tubular component and a portion of the second tubular component; and
   an attachment member attached to at least one of the elongate bar, the distal base, and the mesial base;
   a plurality of threaded cavities permanently configured into the elongate bar, the distal base, and the mesial base; and
   wherein the attachment member is operable to connect the segmental distalization device to an anchor via an elastic connector.

6. The segmental distalization device of claim 5, wherein the segmental distalization device comprises more than one attachment member, wherein each attachment member is removably and adjustably connected to at least one of the elongate bar, the distal base, and the mesial base.

7. The segmental distalization device of claim 5, wherein the first tubular component and the second tubular component are spaced apart telescopically to achieve a desired length of the segmental distalization device.

8. A segmental distalization device comprising:
   a first tubular component having a distal base;
   a second tubular component having a mesial base, the first tubular component being telescopically engaged with the second tubular component;
   an elongate bar formed by a portion of the first tubular component and a portion of the second tubular component; and
   an attachment member attached to at least one of the elongate bar, the distal base, and the mesial base, wherein the attachment member is slidably attached to the elongate bar via a setscrew; and
   wherein the attachment member is operable to connect the segmental distalization device to an anchor via an elastic connector.

9. The segmental distalization device of claim 8, wherein the segmental distalization device comprises more than one attachment member, wherein each attachment member is removably and adjustably connected to at least one of the elongate bar, the distal base, and the mesial base.

10. The segmental distalization device of claim 8, wherein the first tubular component and the second tubular component are spaced apart telescopically to achieve a desired length of the segmental distalization device.

11. The segmental distalization device of claim 8, wherein one or more threaded cavities are permanently configured into the elongate bar, the distal base, and the mesial base.

12. A segmental distalization device comprising:
   an elongate bar having a distal end and a mesial end;
   a distal base on the distal end of the elongate bar;
   a mesial base on the mesial end of the elongate bar;
   a plurality of threaded cavities permanently configured into the elongate bar, the distal base, and the mesial base, wherein an attachment member is slidably attached to the elongate bar via a setscrew; and
   wherein the attachment member is operable to connect the segmental distalization device to an anchor via an elastic connector.

13. A segmental distalization device comprising:
   an elongate bar having a distal end and a mesial end;
   a distal base on the distal end of the elongate bar;
   a mesial base on the mesial end of the elongate bar;
   a plurality of threaded cavities permanently configured into the elongate bar, the distal base, and the mesial base, wherein an attachment member is connected to the elongate bar in one or more of the threaded cavities of at least one of the elongate bar, the distal base, and the mesial base;
   wherein the attachment member is selected from the group consisting of:
   a pin;
   a hook;

a mushroom head-shaped pin; and a pin, hook, or mushroom head-shaped pin with a threaded cavity operable to receive a setscrew to fasten the pin, hook, or mushroom head-shaped pin to the elongate bar via an opening in the pin, hook, or mushroom head-shaped pin, or combinations thereof; and wherein the attachment member is operable to connect the segmental distalization device to an anchor via an elastic connector.

* * * * *